(12) United States Patent
Singh et al.

(10) Patent No.: US 12,312,943 B2
(45) Date of Patent: May 27, 2025

(54) DOWNHOLE PRESSURE SENSING FOR FLUID IDENTIFICATION

(71) Applicant: HALLIBURTON ENERGY SERVICES, INC., Houston, TX (US)

(72) Inventors: John Paul Bir Singh, Kingwood, TX (US); Mikko Jaaskelainen, Houston, TX (US); Krishna Babu Yerubandi, Houston, TX (US); John L. Maida, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 493 days.

(21) Appl. No.: 16/950,556

(22) Filed: Nov. 17, 2020

(65) Prior Publication Data

US 2021/0238983 A1 Aug. 5, 2021

Related U.S. Application Data

(60) Provisional application No. 62/969,019, filed on Feb. 1, 2020, provisional application No. 62/969,022, filed
(Continued)

(51) Int. Cl.
*E21B 47/07* (2012.01)
*E21B 47/135* (2012.01)
(Continued)

(52) U.S. Cl.
CPC ............ *E21B 47/07* (2020.05); *E21B 47/135* (2020.05); *E21B 47/18* (2013.01); *G01D 5/268* (2013.01);
(Continued)

(58) Field of Classification Search
CPC ........ E21B 47/07; E21B 47/135; E21B 47/18; E21B 33/16; E21B 47/01; E21B 47/107;
(Continued)

(56) References Cited

U.S. PATENT DOCUMENTS

| 2,838,116 A | 6/1958 | Clark, Jr. et al. |
| 3,250,330 A | 5/1966 | Smith, Jr. |

(Continued)

FOREIGN PATENT DOCUMENTS

| GB | 2328968 A | 3/1999 |
| WO | 2002057805 A2 | 7/2002 |

(Continued)

OTHER PUBLICATIONS

Johnson, D.O., et al., Society of Petroleum Engineers (SPE) Paper # 77460, "Identification of Steam Breakthrough Intervals Using DTS Technology," Sep. 2002.
(Continued)

*Primary Examiner* — Yanick A Akaragwe
(74) *Attorney, Agent, or Firm* — Polsinelli PC

(57) ABSTRACT

Aspects of the subject technology relate to systems and methods for determining positions of fluids during a cementing process in real-time. Systems and methods are provided for receiving one or more sensing parameters from a distributed acoustic sensing fiber optic line positioned in a wellbore during a cementing process, determining types of fluid proximate to the wellbore based on the one or more sensing parameters received from the distributed acoustic sensing fiber optic line, determining pressure gradients of the types of fluid based on the one or more sensing parameters received from the distributed acoustic sensing fiber optic line, and compiling flow profiles for the types of fluid proximate to the wellbore based on at least one of the determining of the types of fluid and the determining of the pressure gradients of the types of fluid.

17 Claims, 8 Drawing Sheets

Related U.S. Application Data on Feb. 1, 2020, provisional application No. 62/968,985, filed on Jan. 31, 2020.

(51) Int. Cl.

| | | |
|---|---|---|
| *E21B 47/18* | (2012.01) | |
| *G01D 5/26* | (2006.01) | |
| *G01H 9/00* | (2006.01) | |
| *G01K 11/32* | (2021.01) | |
| *G01L 11/02* | (2006.01) | |

(52) U.S. Cl.
CPC .............. *G01H 9/004* (2013.01); *G01K 11/32* (2013.01); *G01L 11/025* (2013.01)

(58) Field of Classification Search
CPC ........ E21B 47/06; G01D 5/268; G01D 5/353; G01H 9/004; G01K 11/32; G01L 11/025
See application file for complete search history.

(56) References Cited

U.S. PATENT DOCUMENTS

| | | | |
|---|---|---|---|
| RE27,459 E | 8/1972 | Guinn et al. | |
| 4,832,121 A | 5/1989 | Anderson | |
| 5,275,038 A | 1/1994 | Sizer et al. | |
| 5,375,661 A | 12/1994 | Daneshy et al. | |
| 5,892,176 A | 4/1999 | Findlay et al. | |
| 5,996,689 A | 12/1999 | Head | |
| 6,268,911 B1 | 7/2001 | Tubel et al. | |
| 6,367,548 B1 | 4/2002 | Purvis et al. | |
| 6,531,694 B2 | 3/2003 | Tubel et al. | |
| 6,532,839 B1 | 3/2003 | Kluth et al. | |
| 7,055,604 B2 | 6/2006 | Jee et al. | |
| 7,448,448 B2 | 11/2008 | Lovell et al. | |
| 7,617,873 B2 | 11/2009 | Lovell et al. | |
| 9,708,867 B2 | 7/2017 | Lovell et al. | |
| 2002/0007945 A1 | 1/2002 | Neuroth et al. | |
| 2005/0274547 A1* | 12/2005 | Fincher ................ | E21B 7/20 175/57 |
| 2011/0186290 A1 | 8/2011 | Roddy et al. | |
| 2011/0192598 A1* | 8/2011 | Roddy ................. | E21B 47/10 166/253.1 |
| 2012/0205103 A1* | 8/2012 | Ravi ..................... | E21B 33/14 166/285 |
| 2014/0180592 A1* | 6/2014 | Ravi ..................... | E21B 47/107 702/11 |
| 2014/0216151 A1 | 8/2014 | Godfrey et al. | |
| 2017/0002622 A1 | 1/2017 | De Bruijn et al. | |
| 2017/0241256 A1* | 8/2017 | Erge ..................... | E21B 47/005 |
| 2017/0268325 A1* | 9/2017 | Draper ................. | E21B 49/02 |
| 2018/0238167 A1* | 8/2018 | Ravi ..................... | G01V 1/226 |
| 2019/0203582 A1* | 7/2019 | Jarvis ................... | G01K 7/18 |
| 2019/0242243 A1* | 8/2019 | Le Calvez ........... | G01V 8/16 |
| 2019/0284931 A1 | 9/2019 | Reinsch et al. | |
| 2021/0079750 A1* | 3/2021 | Skjold ................. | E21B 47/13 |

FOREIGN PATENT DOCUMENTS

| | | |
|---|---|---|
| WO | 2004018840 A1 | 3/2004 |
| WO | 2019070238 A1 | 4/2019 |

OTHER PUBLICATIONS

Fryer, V., et al., Society of Petroleum Engineers (SPE) Paper # 92962, "Monitoring of Real-Time Temperature Profiles Across Multizone Reservoirs During Production and Shut-In Periods Using Permanent Fiber-Optic Distributed Temperature Systems," Apr. 2005.

Economides, M.J., "a practical companion to reservoir stimulation," Developments in Petroleum Science, vol. 34, 1992.

Economides, M.J. et al., "Reservoir Stimulation," Second Edition, 1989.

Smith, Robert, et al., Society of Petroleum Engineers (SPE) Paper # 2686, "Computer Study of Factors Affecting Temperature Profiles in Water Injection Wells," Journal of Petroleum Engineering, p. 1447, Nov. 1970.

Rajah, Benny, et al., Society of Petroleum Engineers (SPE) Paper # 29290, "Experiences and Results of Acid Prepacking and Gravelpacking Wells in the West Luton Field in Sarawak, Malaysia," Mar. 1995.

Wehunt, Jr., C.D., Society of Petroleum Engineers (SPE) Paper # 20137, "Evaluation of Alternating Phase Fracture Acidizing Treatment Using Measured Bottomhole Pressure," Mar. 1990.

Nelson, R.L., et al., Society of Petroleum Engineers (SPE) Paper # 39943, "Multiple Pad-Acid Fracs in a Deep Horizontal Well," Apr. 1998.

Krawietz, T.E., et al., Society of Petroleum Engineers (SPE) Paper # 27809, "Horizontal Well Acidizing of a Carbonate Formation: A Case History of Lisburne Treatments, Prudhoe Bay, Alaska," Nov. 1996.

International Search Report and Written Opinion, PCT Application No. PCT/US2020/062682, Mailed on Mar. 16, 2021.

\* cited by examiner

DOWNHOLE PRESSURE SENSING FOR FLUID IDENTIFICATION

CROSS-REFERENCE TO RELATED APPLICATIONS

This application claims priority to U.S. Provisional Patent Application Nos. 62/968,985, filed on Jan. 31, 2020, entitled "DOWNHOLE PRESSURE SENSING FOR FLUID IDENTIFICATION;" 62/969,019, filed on Feb. 1, 2020, entitled "SMART CEMENT SYSTEM DETECTION USING FIBER;" and 62/969,022, filed Feb. 1, 2020, entitled "CEMENT DETECTION USING ELECTRO-ACOUSTIC TRANSDUCERS," the contents of which are incorporated herein by reference in their entirety.

TECHNICAL FIELD

The present technology pertains to a cementing process, and more particularly, to determining positions of fluids during the cementing process in real-time.

BACKGROUND

The process of cementing a wellbore involves many different types of fluids such as drilling mud, flushes and spacers, cement (e.g., lead and tail cement), and displacement fluid. In general, a concern that occurs during the cementing process is tracking the position of the various fluids in real-time. Currently, there are no processes that inform a cementer of the position of the various fluids, and in particular, the position of the various fluids in real-time. This uncertainty typically leads to defective and inconsistent cementing operations.

BRIEF DESCRIPTION OF THE DRAWINGS

In order to describe the manner in which the features and advantages of this disclosure can be obtained, a more particular description is provided with reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
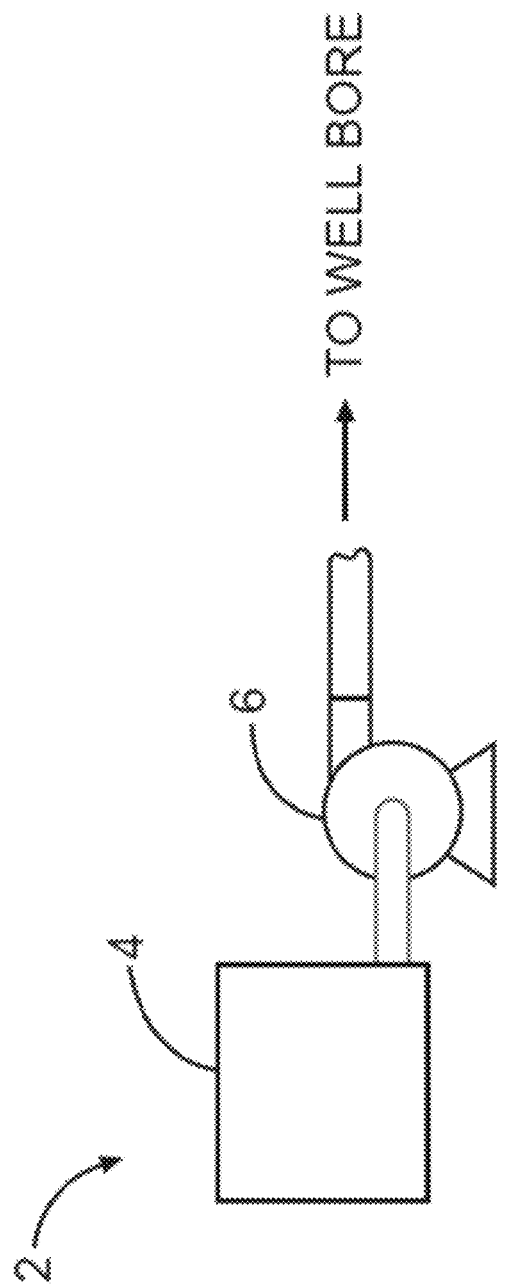
FIG. 1 illustrates a system for preparation and delivery of a cement composition to a well bore in accordance with aspects of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The present technology pertains to determining positions of fluids during a cementing process in real-time, where the cementing process may be adjusted based on the fluid positions. In some implementations, an example sequence of events may include drilling a wellbore, performing casing into the wellbore, cementing an annular space between the casing and a subterranean formation, and fracturing the wellbore once the cement is set, which may be determined by utilizing sensors and/or cables as described herein. The sensors and/or cables used in the present technology can enable a transition from the cementing process to the fracturing process in a safe manner, and the sensors and/or cables can also provide additional value/logical explanations during the fracturing process.

Subterranean hydraulic fracturing is conducted to increase or "stimulate" production from a hydrocarbon well. To conduct a fracturing process, pressure is used to pump special fracturing fluids, including some that contain propping agents ("proppants"), down-hole and into a hydrocarbon formation to split or "fracture" the rock formation along veins or planes extending from the well-bore. Once the desired fracture is formed, the fluid flow is reversed and the liquid portion of the fracturing fluid is removed. The proppants are intentionally left behind to stop the fracture from closing onto itself due to the weight and stresses within the formation. The proppants thus literally "prop-apart", or support the fracture to stay open, yet remain highly permeable to hydrocarbon fluid flow since they form a packed bed of particles with interstitial void space connectivity. Sand is one example of a commonly-used proppant. The newly-created-and-propped fracture or fractures can thus serve as new formation drainage area and new flow conduits from the formation to the well, providing for an increased fluid flow rate, and hence increased production of hydrocarbons.

To begin a fracturing process, at least one perforation is made at a particular down-hole location through the well into a subterranean formation, e.g. through a wall of the well casing, to provide access to the formation for the fracturing fluid. The direction of the perforation attempts to determine at least the initial direction of the fracture.

A first "mini-fracture" test can be conducted in which a relatively small amount of proppant-free fracturing fluid is pumped into the formation to determine and/or confirm at least some of the properties of the formation, such as the permeability of the formation itself. Accurately knowing the permeability allows for a prediction of the fluid leak-off rate at various pressures, whereby the amount of fracturing fluid that will flow into the formation can be considered in establishing a pumping and proppant schedule. Thus, the total amount of fluid to be pumped down-hole is at least the sum of the cased volume of the well, the amount of fluid that fills the fracture, and the amount of fluid that leaks-off into the formation during the fracturing process itself. Leak-off rate is an important parameter because once proppant-laden fluid is pumped into the fracture, leak-off can increase the concentration of the proppant in the fracturing fluid beyond a target level. Data from the mini-fracture test then is usually used by experts to confirm or modify the original desired target profile of the fracture and the completion process used to achieve the fracture.

Fracturing then begins in earnest by first pumping proppant-free fluid into the wellbore or through tubing. The fracture is initiated and begins to grow in height, length, and/or width. This first proppant-free stage is usually called the "pre-pad" and consists of a low viscosity fluid. A second fluid pumping stage is usually then conducted of a different viscosity proppant-free fluid called the "pad." At a particular time in the pumping process, the proppant is then added to a fracturing and propping flow stream using a continuous blending process, and is usually gradually stepped-up in proppant concentration. The resultant fractures are then filled or partly filled with proppant to stabilize the fractures.

This process can be repeated in a plurality of fracturing stages to form a plurality of fractures through a wellbore, e.g. as part of a well completion phase. In particular and as will be discussed in greater detail later, this process can be repeatedly performed through a plug-and-perf technique to form the fractures throughout a subterranean formation. After the fractures are formed, resources, e.g. hydrocarbons, can be extracted from the fractures during a well production phase.

The cementing process may include various binder compositions and processes. The binder compositions disclosed herein may directly or indirectly affect one or more components or pieces of equipment associated with the preparation, delivery, recapture, recycling, reuse, and/or disposal of the disclosed binder compositions. For example, the disclosed binder compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary binder compositions. The disclosed binder compositions may also directly or indirectly affect any transport or delivery equipment used to convey the binder compositions to a well site or downhole such as, for example, any transport vessels, conduits, pipelines, trucks, tubulars, and/or pipes used to compositionally move the binder compositions from one location to another, any pumps, compressors, or motors (e.g., topside or downhole) used to drive the binder compositions into motion, any valves or related joints used to regulate the pressure or flow rate of the binder compositions, and any sensors (i.e., pressure and temperature), gauges, and/or combinations thereof, and the like. The disclosed binder compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The disclosed technology addresses the foregoing by determining fluid positions of a cementing process. In turn, positions of fluids can be determined based on data received from sensors during the cementing process in real-time.

In various embodiments, a method for determining positions of fluids during a cementing process in real-time can include receiving one or more sensing parameters from a distributed acoustic sensing fiber optic line positioned in a wellbore during a cementing process. The method can further include determining types of fluid proximate to the wellbore based on the one or more sensing parameters received from the distributed acoustic sensing fiber optic line. The method can also include determining pressure gradients of the types of fluid based on the one or more sensing parameters received from the distributed acoustic sensing fiber optic line. The method can additionally include compiling flow profiles for the types of fluid proximate to the wellbore based on at least one of the determining of the types of fluid and the determining of the pressure gradients of the types of fluid.

In various embodiments, a system for determining positions of fluids during a cementing process in real-time can include one or more processors; and at least one computer-readable storage medium having stored therein instructions which, when executed by the one or more processors, cause the system to receive one or more sensing parameters from a distributed acoustic sensing fiber optic line positioned in a wellbore during a cementing process. The instructions can further cause the system to determine types of fluid proximate to the wellbore based on the one or more sensing parameters received from the distributed acoustic sensing fiber optic line. Furthermore, the instructions can cause the system to determine pressure gradients of the types of fluid based on the one or more sensing parameters received from the distributed acoustic sensing fiber optic line. The instructions can additionally cause the system to compile flow profiles for the types of fluid proximate to the wellbore based on at least one of the determination of the types of fluid and the determination of the pressure gradients of the types of fluid.

In various embodiments, a non-transitory computer-readable storage medium comprising instructions stored on the non-transitory computer-readable storage medium, the instructions, when executed by one or more processors, cause the one or more processors to receive one or more sensing parameters from a distributed acoustic sensing fiber optic line positioned in a wellbore during a cementing process. The instructions can further cause the one or more processors to determine types of fluid proximate to the wellbore based on the one or more sensing parameters received from the distributed acoustic sensing fiber optic line. Furthermore, the instructions can further cause the one or more processors to determine pressure gradients of the types of fluid based on the one or more sensing parameters received from the distributed acoustic sensing fiber optic line. The instructions can additionally cause the one or more processors to compile flow profiles for the types of fluid proximate to the wellbore based on at least one of the determination of the types of fluid and the determination of the pressure gradients of the types of fluid.

The process of cementing a wellbore involves many different types of fluids such as drilling mud, flushes and spacers, cement (e.g., lead and tail cement), and displacement fluid. In general, a concern that occurs during the cementing process is tracking the position of the various fluids in real-time. Currently, there are no processes that inform a cementer of the position of the various fluids, and in particular, the position of the various fluids in real-time. This uncertainty typically leads to defective and inconsistent cementing operations.

During both forward cementing and reverse cementing processes, the knowledge of fluid positons and the level (e.g., amount or percentage) of mixing between the various fluids can provide relevant and critical information for the real-time operations.

Referring now to FIG. 1, a system that may be used in the preparation of a cement composition in accordance with example embodiments will now be described. FIG. 1 illustrates a system 2 for preparation of a cement composition and delivery to a well bore in accordance with certain embodiments. As shown, the cement composition may be mixed in mixing equipment 4, such as a jet mixer, recirculating mixer, or a batch mixer, for example, and then pumped via pumping equipment 6 to the well bore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the composition, including water, as it is being pumped to the well bore.

Figure 2A:
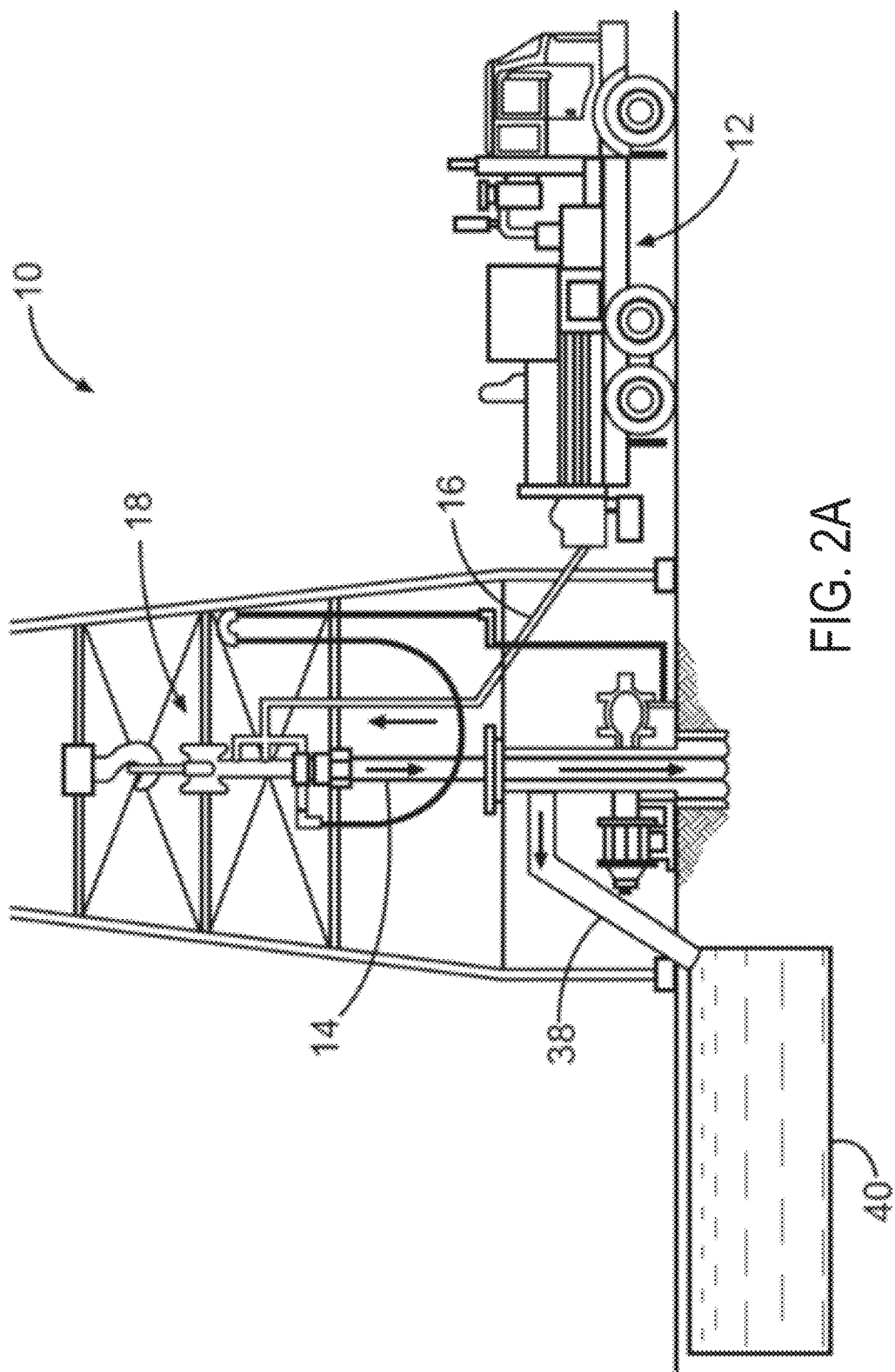
FIG. 2A illustrates surface equipment that may be used in placement of a cement composition in a well bore in accordance with aspects of the present disclosure.

An example technique and system for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
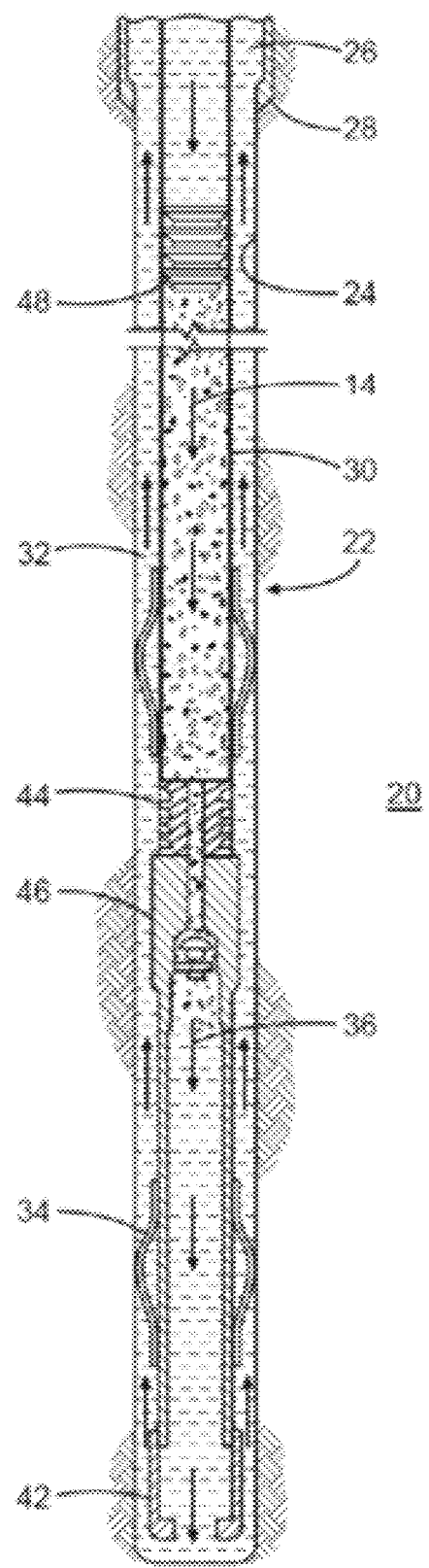
FIG. 2B illustrates placement of a cement composition into a well bore annulus in accordance with aspects of the present disclosure.

Turning now to FIG. 2B, the cement composition 14 may be placed into a subterranean formation 20 in accordance with example embodiments. As illustrated, a well bore 22 may be drilled into the subterranean formation 20. While well bore 22 is shown extending generally vertically into the subterranean formation 20, the principles described herein are also applicable to well bores that extend at an angle through the subterranean formation 20, such as horizontal and slanted well bores. As illustrated, the well bore 22 comprises walls 24. In the illustrated embodiments, a surface casing 26 has been inserted into the well bore 22. The surface casing 26 may be cemented to the walls 24 of the well bore 22 by cement sheath 28. In the illustrated embodiment, one or more additional conduits (e.g., intermediate casing, production casing, liners, etc.) shown here as casing 30 may also be disposed in the well bore 22. As illustrated, there is a well bore annulus 32 formed between the casing 30 and the walls 24 of the well bore 22 and/or the surface casing 26. One or more centralizers 34 may be attached to the casing 30, for example, to centralize the casing 30 in the well bore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the well bore annulus 32. The cement composition 14 may be allowed to set in the well bore annulus 32, for example, to form a cement sheath that supports and positions the casing 30 in the well bore 22. While not illustrated, other techniques may also be utilized for introduction of the cement composition 14. By way of example, reverse circulation techniques may be used that include introducing the cement composition 14 into the subterranean formation 20 by way of the well bore annulus 32 instead of through the casing 30.

As it is introduced, the cement composition 14 may displace other fluids 36, such as drilling fluids and/or spacer fluids, that may be present in the interior of the casing 30 and/or the well bore annulus 32. At least a portion of the displaced fluids 36 may exit the well bore annulus 32 via a flow line 38 and be deposited, for example, in one or more retention pits 40 (e.g., a mud pit), as shown on FIG. 2A. Referring again to FIG. 2B, a bottom plug 44 may be introduced into the well bore 22 ahead of the cement composition 14, for example, to separate the cement composition 14 from the fluids 36 that may be inside the casing 30 prior to cementing. After the bottom plug 44 reaches the landing collar 46, a diaphragm or other suitable device ruptures to allow the cement composition 14 through the bottom plug 44. In FIG. 2B, the bottom plug 44 is shown on the landing collar 46. In the illustrated embodiment, a top plug 48 may be introduced into the well bore 22 behind the binder composition 14. The top plug 48 may separate the cement composition 14 from a displacement fluid 50 and also push the cement composition 14 through the bottom plug 44.

Figure 3:
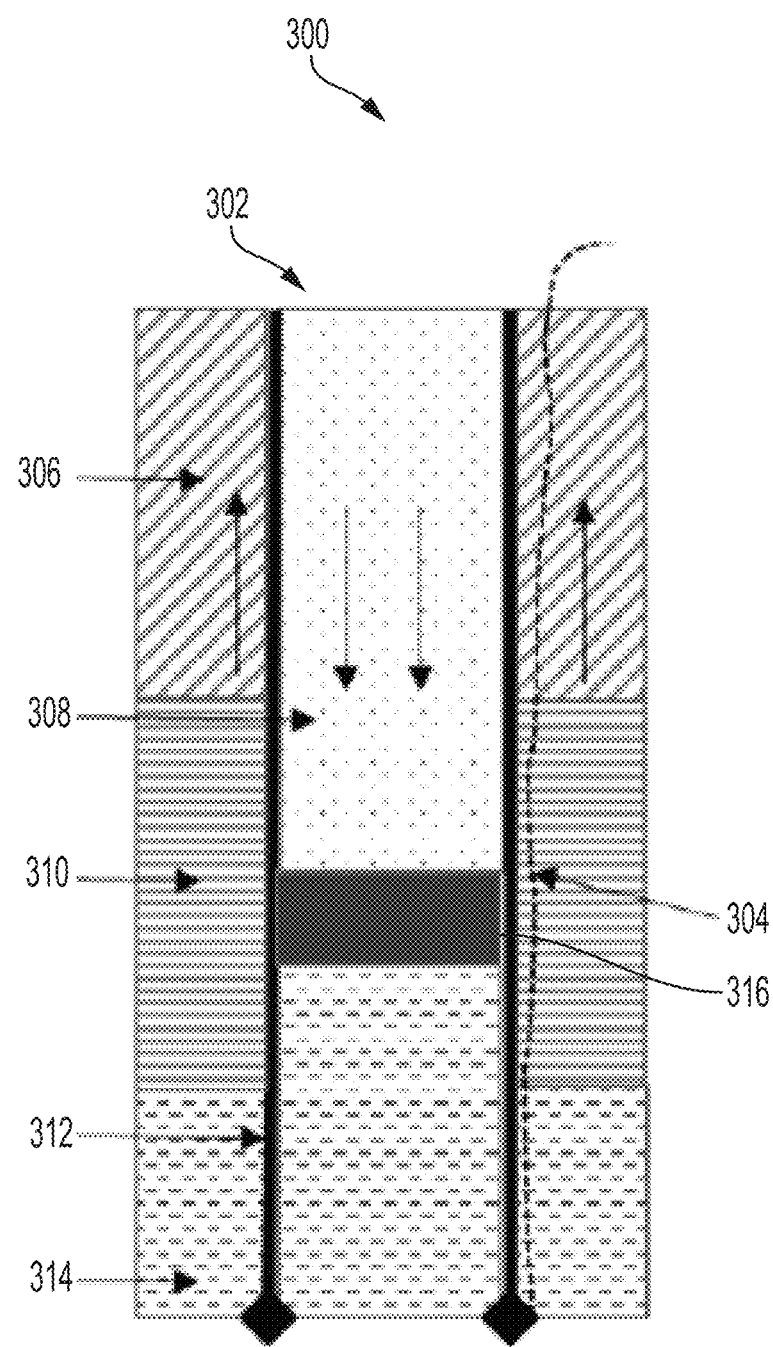
FIG. 3 illustrates an example schematic of a fiber optic line system including a wellbore, fluid positions, and a distributed acoustic sensing fiber optic line during a forward cementing process in accordance with aspects of the present disclosure.
Figure 4:
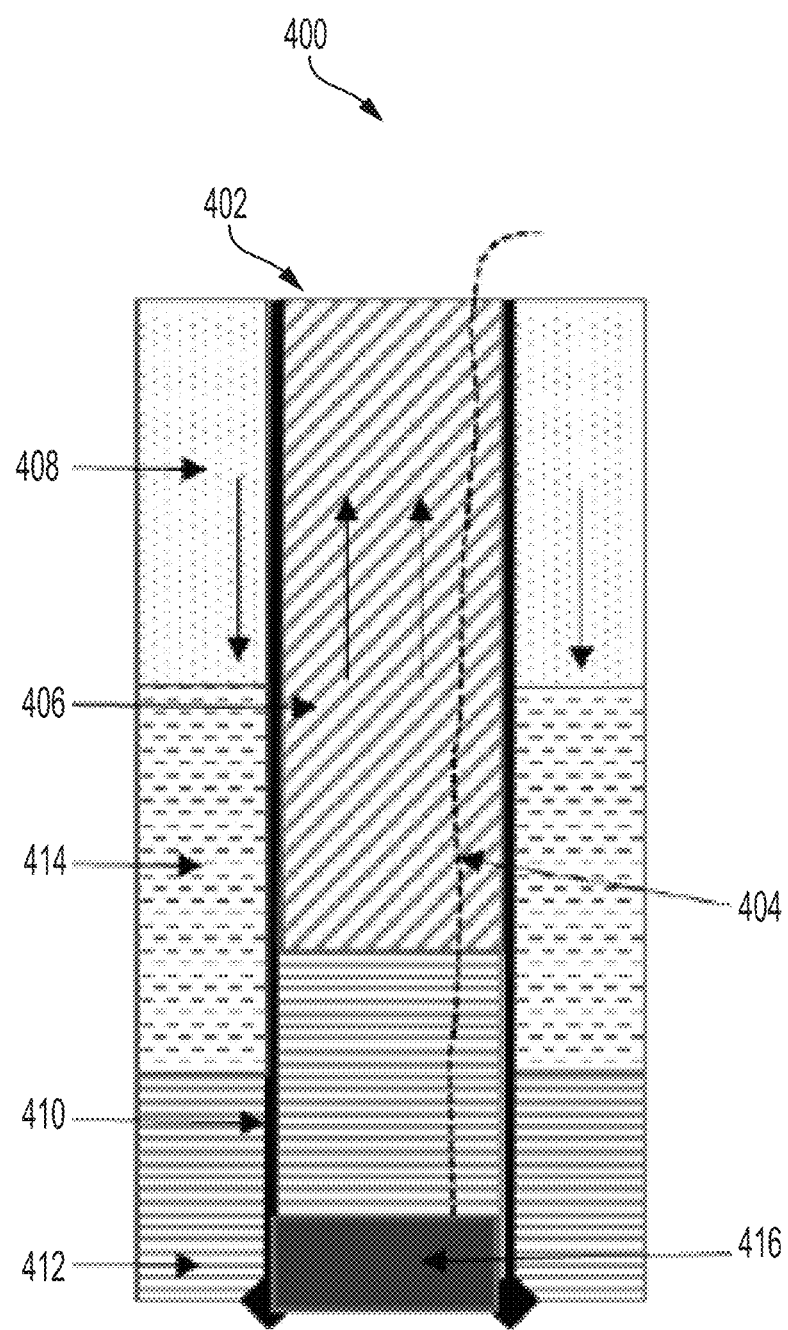
FIG. 4 illustrates an example schematic of a fiber optic line system including a wellbore, fluid positions, and a distributed acoustic sensing fiber optic line during a reverse cementing process in accordance with aspects of the present disclosure.

FIGS. 3 and 4 illustrates example schematics of fiber optic line systems 300, 400 that can be utilized during a forward cementing process and a reverse cementing process. FIG. 3 illustrates an example schematic of a fiber optic line system 300 including a wellbore 302, fluid positions 306, 308, 310, 314, and a distributed acoustic sensing fiber optic line 304 during a forward cementing process in accordance with aspects of the present disclosure. Fiber optic line system 300 can include distributed acoustic sensing fiber optic line 304 and a cement plug 316. Fluids 306, 308, 310, 314 can be distributed throughout or proximate to wellbore 302 and can include mud 306, displacement fluid 308, spacer 310, and cement 314.

In some instances, the forward cementing process of fiber optic line system 300 can include displacement fluid 308 being pumped into wellbore 302, displacement fluid 308 forces cement plug 316 downwards further into wellbore 302. The force of cement plug 316 then pushes cement 314 into wellbore 302, and subsequently, out of a downhole end of casing 312 and into a spacing (e.g., annulus) between casing 312 and the subterranean rock formation. In turn, as cement 314 rises through the spacing (e.g., annulus) between casing 312 and the subterranean rock formation, spacer 310 and mud 306 are forced in an upward direction, away from the downhole end of casing 312.

FIG. 4 illustrates an example schematic of a fiber optic line system 400 including of a wellbore 402, fluid positions 406, 408, 412, 414, and a distributed acoustic sensing fiber optic line 404 during a reverse cementing process in accordance with aspects of the present disclosure. Fiber optic line system 400 can include distributed acoustic sensing fiber optic line 404 and a float shoe 416. Float shoe 416 can be an integral check valve or any other device suitable for the intended purpose and understood by a person of ordinary skill in the art. Fluids 406, 408, 412, 414 can be distributed throughout or proximate to wellbore 402 and can include mud 406, displacement fluid 408, spacer 412, and cement 414.

In some instances, the reverse cementing process of fiber optic line system 400 can include mud 406 being pumped from an interior region of casing 410, cement 414 is forced downward into a spacing (e.g., annulus) between casing 410 and the subterranean rock formation towards a downhole end of casing 410. Thereafter, displacement fluid 408 is pumped into the spacing (e.g., annulus) between casing 410 and the subterranean rock formation towards the downhole end of casing 410. As displacement fluid 408 is forced into the spacing (e.g., annulus) between casing 410 and the subterranean rock formation, displacement fluid 408 pushes cement 414 downwards towards the downhole end of casing 410.

Referring to FIG. 3, fiber optic line system 300 may further include sensors that can be permanently or temporarily installed, and the sensors may include fiber optic lines 304 cemented in place in the annular space between casing 312 and the subterranean formation (e.g., spacer 310 or cement 314) or installed after casing 312 has been installed. Fiber optic lines 304 may be clamped to the outside of casing 312 during the deployment and protected by centralizers and cross coupling clamps, or to the inside of casing 312. Fiber optic lines and/or optical fibers 304 may also be coiled tubing deployed, wireline deployed, deployed from a device (as described herein) attached to a plug that is being pumped down wellbore 302 with displacement fluid 308, deployed from a device (as described herein) that is moved into wellbore 302 by means of gravity, deployed from a device (as described herein) that is self-propelled down wellbore 302, deployed from a device (as described herein) located at the surface where fiber optic line 304 is moved into wellbore 302 using fluid drag that can interact with fiber optic line 304, thus propelling fiber optic line 304 into wellbore 302, where the distal end of fiber optic line 302 may include a device (as described herein) for increasing a propelling force such as an end-cap with a mechanical size that is larger than fiber optic line 302 where the end-cap may include one or more point sensors. Fiber optic lines and/or optical fibers 302 may also be deployed outside or inside casing 312, tubing, or other devices or means of conveyance in wellbores that may be suitable for the intended purpose and understood by a person of ordinary skill in the art. Other types of sensors may include surface and down-hole pressure sensors, where the pressure sensors may be capable of collecting data at rates up to 2,000 Hz or even higher.

Fiber optic lines 304 may house one or several optical fibers and the optical fibers may be single mode fibers, multi-mode fibers or a combination of single mode and multi-mode optical fibers. The fiber optic line systems 300 can include optical fibers 304 such as Distributed Temperature Sensing (DTS) systems, Distributed Acoustic Sensing (DAS) Systems, Distributed Strain Sensing (DSS) Systems, quasi-distributed sensing systems where multiple single point sensors are distributed along an optical fiber/cable, or single point sensing systems where the sensors are located at the end of the cable.

The fiber optic line systems 300 may operate using various sensing principles including but not limited to amplitude based sensing systems such as DTS systems based on Raman scattering, phase sensing based systems such as DAS systems based on interferometric sensing using homodyne or heterodyne techniques where the system may sense phase or intensity changes due to constructive or destructive interference based on Rayleigh scattering, strain sensing systems such as DSS using dynamic strain measurements based on interferometric sensors or static strain sensing measurements based on Brillouin scattering, quasi-distributed sensors based on Fiber Bragg Gratings (FBGs) where a wavelength shift is detected or multiple FBGs are used to form Fabry-Perot type interferometric sensors for phase or intensity based sensing, or single point fiber optic sensors based on Fabry-Perot or FBG or intensity based sensors.

Electrical sensors of fiber optic line system 300 may be pressure sensors based on quarts type sensors or strain gauge based sensors or other commonly used sensing technologies. Pressure sensors, optical or electrical, may be housed in dedicated gauge mandrels or attached outside the casing in various configurations for down-hole deployment or deployed conventionally at the surface well head or flow lines.

Various hybrid approaches where single point or quasi-distributed or distributed fiber optic sensors are mixed with electrical sensors are also anticipated. Fiber optic line 304 may further include optical fiber and electrical conductors.

Temperature measurements from a DTS system may be utilize by fiber optic line system 300 to determine locations for fluid inflow in a treatment well as the fluids from the surface are likely to be cooler than formation temperatures. DTS warm-back analyses can be utilized to determine fluid volume placement, which can be performed for water injection wells, and the same technique can also be used for fracturing fluid placement and measuring cement curing temperatures (e.g., heat of hydration) as a function of time during and after a cement placement process. Temperature measurements in observation wells can be utilized to determine fluid communication between the treatment well and observation well, or to determine formation fluid movement.

DAS data can be utilized by fiber optic line system 300 to determine fluid allocation in real-time as acoustic noise is generated when fluid flows through casing 312 and in through perforations into the formation. Phase and intensity based interferometric sensing systems are sensitive to temperature and mechanical as well as acoustically induced vibrations. DAS data can be converted from time series date to frequency domain data using Fast Fourier Transforms (FFT) and other transforms like wavelet transforms may also be used to generate different representations of the data. Various frequency ranges can be used for different purposes and where low frequency signal changes may be attributed to formation strain changes or fluid movement and other frequency ranges may be indicative of fluid or gas movement.

Various filtering techniques may be applied by fiber optic line system 300 to generate indicators of events that may be of interest. Indicators may include formation movement due to growing natural fractures, formation stress changes during the fracturing operations (e.g., stress shadowing), fluid seepage during the fracturing operation as formation movement may force fluid into an observation well (which may be detected), fluid flow from fractures, and fluid and proppant flow from fracture hits. Each indicator may have a characteristic signature in terms of frequency content and/or amplitude and/or time dependent behavior, and these indicators may be present at other data types and not limited to DAS data.

DAS systems can also be utilized to detect various seismic events where stress fields and/or growing fracture networks generate microseimic events or where perforation charge events may be used to determine travel time between horizontal wells. This information can be utilized by fiber optic line system 300 from stage to stage to determine changes in travel time as the formation is fractured and filled with fluid and proppant. The DAS systems may also be used with surface seismic sources to generate vertical seismic profiles before, during, and after a fracturing job to determine the effectiveness of the fracturing job as well as determine production effectiveness.

DSS data can be generated by fiber optic line system 300 using various approaches and static strain data can be used to determine absolute strain changes over time. Static strain data can be measured using Brillouin based systems or quasi-distributed strain data from a FBG based system. Static strain may also be used to determine propped fracture volume by reviewing deviations in strain data from a measured strain baseline before fracturing a stage. Fiber optic line system 300 can also determine formation properties such as permeability, poroelastic responses, and leak off rates based on the change of strain versus time and the rate at which the strain changes over time. Dynamic strain data can be utilized by fiber optic line system 300 in real-time to detect fracture growth through an appropriate inversion model, and appropriate actions such as dynamic changes to fluid flow rates in the treatment well, addition of diverters or chemicals into the fracturing fluid, or changes to proppant concentrations or types can then be used to mitigate detrimental effects.

Fiber Bragg Grating based systems may also be utilized for a number of different measurements. For example, FBG's can include partial reflectors that can be used as temperature and strain sensors, or can be used to make various interferometric sensors with very high sensitivity. FBG's can also be utilized to make point sensors or quasi-distributed sensors, where the FBG-based sensors can be used independently or with other types of fiber optic based sensors. FBG's can be manufactured into an optical fiber at a specific wavelength, and other systems such as DAS, DSS, or DTS systems that may operate at different wavelengths in the same fiber and measure different parameters simultaneously as FBG-based systems utilizing Wavelength Division Multiplexing (WDM).

The sensors of fiber optic line system 300 can be positioned in either a treatment well or monitoring wells to measure well communication. The treatment well pressure, rate, proppant concentration, diverters, fluids, and chemicals may be adjusted to change the hydraulic fracturing treatment. These changes may impact the formation responses in several different ways such as: 1) stress fields may change, and this may generate microseismic effects that can be measured with DAS systems and/or single point seismic sensors like geophones; 2) fracture growth rates may change and this can generate changes in measured microseismic events and event distributions over time, or changes in measured strain using the low frequency portion or the DAS signal or Brillouin-based sensing systems; 3) pressure changes due to poroelastic effects may be measured in the monitoring well; 4) pressure data may be measured in the treatment well and correlated to formation responses; and 5) various changes in treatment rates and pressure may generate events that can be correlated to fracture growth rates.

Several measurements can be combined by fiber optic line system 300 to determine adjacent well communication and fluid position, and this information can be utilized to change hydraulic fracturing treatment schedules to generate desired outcomes.

In some implementations, fiber optic line system 300 can measure and relay real-time positions of fluids, measure cement barrier quality, and/or detect loss circulation locations and their corresponding magnitudes. With the DAS enabled fiber optic line 304 of fiber optic line system 300 in wellbore 302 (e.g., either inside or outside casing 312), fiber optic line system 300 can actuate a wellbore system with controlled "noise" (e.g., from an acoustic source) and then measure the response as a function of the depth.

The acoustic signal attenuation can be a function of the properties of the medium. For example, the density and compressibility of the medium can play a critical role in the acoustic signal attenuation. Furthermore, the signal may scatter due to the presence of inhomogeneities or an interface that may cause partial/complete reflections. Fiber optic line system 300 may be actuated during cementing operations and/or after the cement has been positioned accordingly.

In other implementations, fiber optic line 304 can be a pressure sensitive fiber line and deployed in wellbore 302 to provide real-time pressure profiles of wellbore 302. For example, pressure gradients are intimately associated with flow rate and viscosity of a corresponding fluid. Due to density and rheological hierarchy within mud 306, spacer 310, and cement 314, corresponding viscosity information may be utilized by fiber optic line system 300 to identify the presence of fluids 306, 308, 310, 314 in real-time. For example, fiber optic line 304 can be attached or positioned proximate to the outside or inside of casing 312. For instances where fiber optic line 304 is positioned outside of casing 312, fiber optic line 304 may be more relevant for fluid identification in a forward cementing process. For instances where fiber optic line 304 is positioned inside of casing 312, fiber optic line 304 may be utilized for identifying cements 314 turning a corner to go up casing 312 during reverse cementing operations.

The relationship between a pressure gradient and fluid properties such as density and viscosity is provided in the following equation:

$$\frac{dP}{dx} \sim \frac{\mu Q}{A^2} + \rho \cdot g.$$

P is pressure, x is the axis along wellbore 302, Q is flow rate, μ is viscosity, ρ is fluid density, g is a gravitational constant, and A is a cross sectional flow area. In this instance, the pressure gradient is directly proportional to the viscosity of the fluid. The pressure gradient equation can be utilized for Newtonian fluids. For non-Newtonian fluids such shear thinning, Power law, Bingham, Herschel Bulkley, generalized Herschel Bulkley, etc., the relationship between the pressure gradient is still positive. In some instances, fiber optic line 304 can be utilized to detect and communicate pressure data along the length of fiber optic line 304. The pressure gradient detected by fiber optic line 304 may be utilized to determine the type of fluid in each section of wellbore 302, loss zones, and any signal of "free fall."

In some implementations, fiber optic line 304 can be a pressure sensitive fiber optic line and configured to detect and measure pressure within wellbore 302. The pressure sensitive fiber optic line can further be distributed and based on Brillouin, Raman, and/or Rayleigh scattering. Alternatively, the pressure sensitive fiber optic line can be quasi-distributed and based on various sensor types and sensing principles including but not limited to Fiber Bragg Grating (FBG)-based sensors with or without enhanced birefringence, Fabry-Perot, Michelson, and/or Mach-Zehnder type sensors, and/or coating materials designed to enhance pressure responses. Based on the pressure gradient, fiber optic line system 300 can determine the type of fluid at a particular location. For example, water has a density of about 1000 kg/m$^3$, which is about half the density of cement. As such, fiber optic line system 300 can determine the type of fluid based on the pressure gradient measured by pressure sensitive fiber optic line 304. Pressure sensitive fiber optic line 304 can also take measurements at different time intervals, providing the opportunity to compare pressure gradient measurements over a period of time. Furthermore, as pressured can be measured over time by pressure sensitive fiber optic line 304, any changes in state (e.g., fluid or solid) can be detected by fiber optic line system 300. For example, fiber optic line system 300 can detect when the fluid turns into a solid based on the pressure measurements detected by pressure sensitive fiber optic line 304.

In some instances, while fluids (e.g., displacement fluid 308) are pumped into wellbore 302, displacement fluid 308 can flow from topside and down into wellbore 302. In such an instance, fiber optic line 304 can be utilized by fiber optic line system 300 to measure various parameters such as pressure, temperature, strain, vibration, and/or acoustic parameters as a function of depth and time. For example, pressure parameters can be measured at various intervals along fiber optic line 304 (e.g., at various radius time intervals) and processed to generate pressure and/or flow profiles over time. Fiber optic line system 300 can then generate flow profiles of fluids and/or slurries along the subterranean rock formation based on the measurements received from fiber optic line 304. Fiber optic line 304 can be utilized as a sensor to measure parameters (e.g., pressure parameters) and/or a transmission medium to provide measurements to fiber optic line system 300. External sensors and devices (e.g., acoustic pulses), as described herein, can be utilized to further supplement the flow profiles generated by fiber optic line system 300. For example, the measurements received from fiber optic line 304 can by utilized by fiber optic line system 300 to determine the position of the various fluids (e.g., mud 306, displacement fluid 308, and cement 314) surrounding wellbore 302.

In other implementations, fiber optic line 304 of fiber optic line system 300 can be positioned within, in an interior portion, or an exterior portion of casing 312 of fiber optic line system 300. For example, as illustrated in FIG. 3, fiber optic line 304 is positioned along an exterior portion of casing 314 during a forward cementing process, while in FIG. 4, fiber optic line 404 is positioned along an interior portion of casing 410 during a reverse cementing process. However, it is envisioned that fiber optic lines 304, 404 can be positioned along either the interior or exterior portions of respective casings 314, 410 of fiber optic line systems 300, 400 during a forward or reverse cementing process. For example, both forward and reverse cementing processes can position fiber optic line 304, 404 along an interior or exterior region of casing 312, 410 of fiber optic line system 300, 400. In some instances, fiber optic lines 304, 404 can be attached to casings 314, 410 of fiber optic line systems 300, 400 with an adhesive, fastener, tape, glue, bonding, sealant, screw, nail, or any other type of fastener suitable for the intended purpose and understood by a person of ordinary skill in the art. Fiber optic lines 304 may be fiber optic cables in various configurations with one or more optical fibers encased in a protective housing that may be used in wellbore applications and/or optical fibers with various coatings.

A challenge encountered during a forward cementing process is determining when to stop pumping. For example, in a forward cementing process, cement plug 316 can be utilized and if cement plug 316 becomes settled, issues can arise. As such, determining fluid (e.g., mud 306, displacement fluid 308, spacer 310, and cement 314) position becomes important to assist in the determination of when to stop pumping during the cementing process. In such instances, fiber optic lines 304, 404 of fiber optic line systems 300, 400 can be utilized to determine the position of the fluids (e.g., mud 306, displacement fluid 308, spacer 310, and cement 314) and to stop pumping accordingly.

In some implementations, fiber optic line 304 of fiber optic line system 300 can be utilized to identify and indicate the position of the fluids (e.g., mud 306, displacement fluid 308, spacer 310, and cement 314) to determine when to stop the cementing process in both reverse cementing and forward cementing applications. For example, fiber optic line 304 can be positioned along the exterior region of casing 312 that would provide data and measurements of cement 314 in relation to other types of fluids (e.g., mud 306, displacement fluid 308, and spacer 310).

As the cementing process continues, fiber optic line 304 can continuously obtain measurements of the surrounding fluids (e.g., mud 306, displacement fluid 308, spacer 310, and cement 314) to determine their respective positions to one another. Such data and measurements can also be utilized by fiber optic system 300 to generate reports for customers and regulatory authorities that communicate that the formation area has been effectively sealed off. As such, having fiber optic line 304 on the exterior region of casing 312 can assist fiber optic system 300 in determining that the formation area has been effectively sealed off, and having fiber optic line 404 on the interior region of casing 410 can assist fiber optic system 400 in determining when to stop the reverse cementing process. As described herein, as fiber optic lines 304, 404 of fiber optic line systems 300, 400 continuously measure pressure parameters along casings 312, 410 during a cementing process, fiber optic line systems 300, 400 can determine the position of cement 314, 414, thereby determining whether cement 314, 414 has been installed in the correct position. Once it is determined that cement 314, 414 is in the correct position, the cementing process can stop and be completed.

Figure 5:
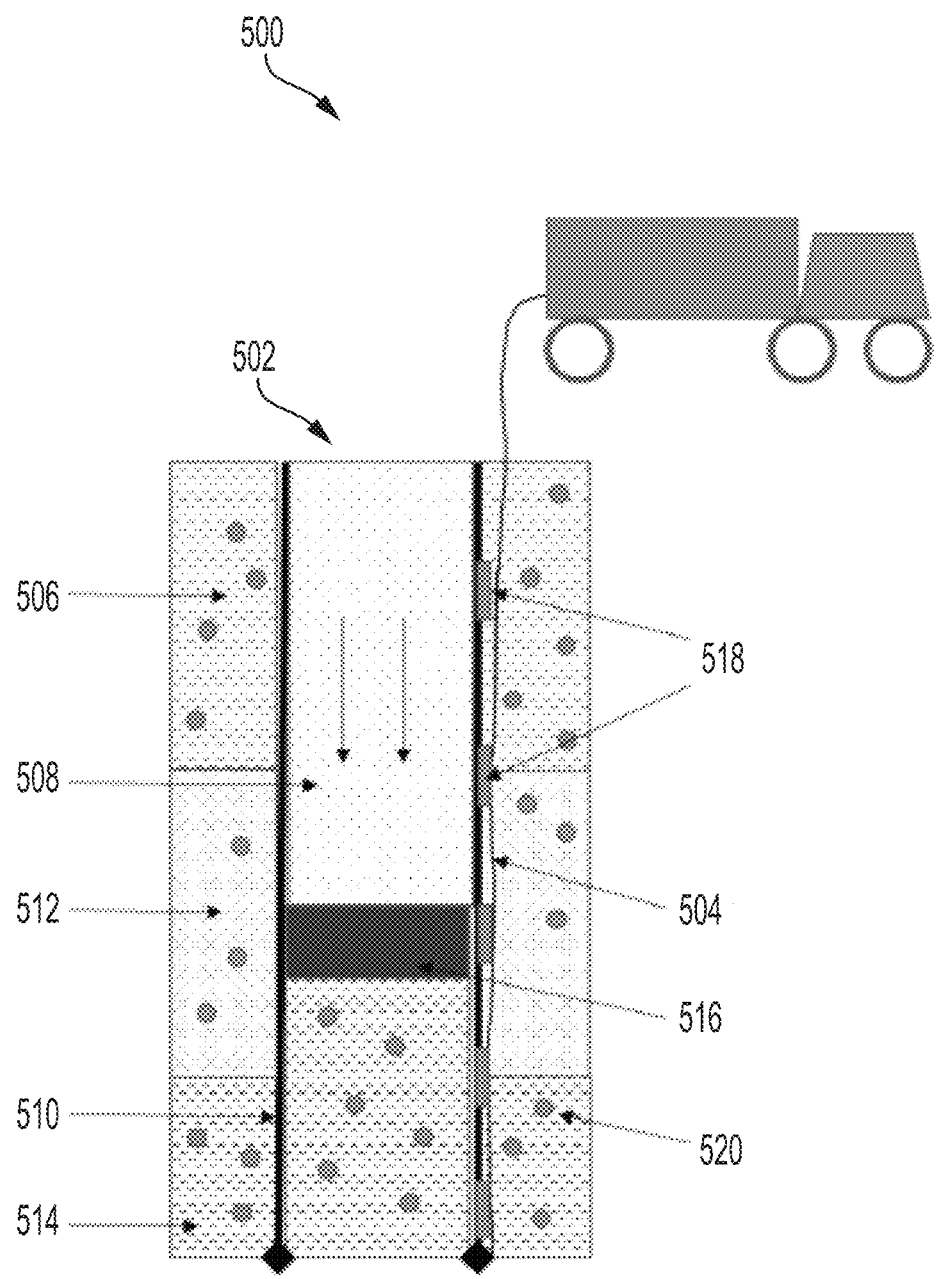
FIG. 5 illustrates an example schematic of a fiber optic line system including a wellbore, fluid positions, and sensors during a forward cementing process in accordance with aspects of the present disclosure.

FIG. 5 illustrates an example schematic of a fiber optic line system 500 including a wellbore 502, fluid positions 506, 508, 512, 514, and sensors 520 during a forward cementing process in accordance with aspects of the present disclosure. The forward cementing process of fiber optic line system 500 of FIG. 5 can be similar to the forward cementing process of fiber optic line system 300 of FIG. 3. Fiber optic line system 500 can include distributed acoustic sensing fiber optic line 504 and a cement plug 516. Fluids 506, 508, 512, 514 can be distributed throughout or proximate to wellbore 502 and can include mud 506, displacement fluid 508, spacer 512, and cement 514.

In some implementations, fiber optic line 504 can be a distributed acoustic sensing fiber option line that can installed in wellbore 502 and utilized as a telemetry device. Furthermore, fiber optic line system 500 can utilize doping the various wellbore fluids (e.g., mud 506, displacement fluid 508, spacer 512, and cement 514) with microelectromechanical system (MEMS)-based sensors/tracers 520 to provide a mechanism to measure real-time downhole characteristics of wellbore 502. Electro-acoustic transducers (EATs) 518 may also be utilized by fiber optic line system 500 to receive downhole characteristic measurements of wellbore 502 and to communicate the downhole characteristics to the surface in real-time. EATs are sensing modules with one or more sensors, electronics, batteries and acoustic transducers. The EAT sensing modules 518 sense one or more parameters like e.g. temperature, pressure, strain, vibration, acceleration, pH, conductivity, resistivity, electrically transmitted signals, RFID tags or other parameters, process the sensed parameters and acoustically transmit a signal proportional to the sensed parameter or parameters. The EAT's may also include the option to not sense any parameters and actively transmit an acoustic signal to allow position location. The acoustic transmission propagates to fiber optic line 504 and further into the optical fiber that is being interrogated by fiber optic line system 500. Fiber optic line system 500 may also be a distributed acoustic sensing system interrogator, where the acoustically transmitted signals from EAT sensing modules 518 can impact the optical fiber and can be detected using fiber optic line system 500. Fiber optic line system 500 may include one or more processors or may be communicatively coupled to one or more processors that converts the detected acoustic signal into a sensed parameter. The sensed parameter may then be displayed or further processed to control and/or enhance the operation in real-time, which can then be used for post processing to improve future operations by fiber optic line system 500. Various models for controlling operations may include data driven or machine learning based models that may be updated in real-time using the data, or post-job to enhance existing models and control algorithms or chemical compositions of cement slurries and other chemicals.

Fiber optic line system 500 may utilize EATs 518 and/or sensors 520 simultaneously, individually, exclusively, or varyingly throughout wellbore 502. For example, as shown in FIG. 5, fiber optic line system 500 can utilize fiber optic line 504, EATs 518, and sensors 520. In another instance, fiber optic line system 500 can utilize fiber optic line 504 and EATs 518, or fiber optic line 504 and sensors 520. Furthermore, EATs 518 and sensors 520 may be distributed throughout wellbore fluids (e.g., mud 506, displacement fluid 508, spacer 512, and cement 514) evenly or at predetermined positions. For example, in one instance, fiber optic line system 500 may utilize two EATs 518 and two sensors 520 in each of the wellbore fluids (e.g., mud 506, displacement fluid 508, spacer 512, and cement 514). In another instance, fiber optic line system 500 may utilize two EATs 518 in each of the wellbore fluids (e.g., mud 506, displacement fluid 508, spacer 512, and cement 514), and nine sensors 520 in mud 506, six sensors 520 in spacer 512, and twelve sensors 520 in cement 514.

Fiber optic line systems 300, 400, 500 can utilize fiber optic lines 304, 404, 504, EATs 518, and/or sensors 520 to determine real-time positions of the fluids (e.g., mud 506, displacement fluid 508, spacer 512, and cement 514) during wellbore cementing processes. In some instances, information relating to temperature, pressure, and pH of the environment may also be measured by fiber optic lines 304, 404, 504, EATs 518, and/or sensors 520. In other instances, EATs 518 and sensors/tracers 520 may be communicatively coupled to fiber optic line 504 (e.g., a DAS-enabled fiber optic line) to communicate with the surface. EATs 518 may be positioned outside of casing 510 with fiber optic line 504 being outside of casing 510. In other instances, EATs 518 may be positioned outside of casing 510 with fiber optic line 504 being inside of casing 510. EATs 518 may also be positioned in plugs 516 and/or tools deployed in wellbore 502 of fiber optic line 504 may be positioned inside and/or outside of casing 510 or various combinations. EATs 518 may also be configured or positioned to move along with fluids 506, 508, 512, cement slurries 514, tools, and plugs 516.

For example, the various fluids (e.g., mud 506, displacement fluid 508, spacer 512, and cement 514) can be doped with a tracer particle 520. Tracers 520 can include "dumb" radio frequency identification ("RFID") chips with unique IDs or "smart" devices that can record temperature, pressure, and pH along with their corresponding ID. EATs 518 can further be designed to interrogate tracers 520 (e.g., with RFID chips) in real-time as tracers 520 flow past EATs 518 during the cementing process. In some instances, EATs 518 can be positioned along with the fiber optic line 504 and on the outside of casing 510. As tracers 520 (e.g., RFID chips) flow past EATs 518, information from tracers 520 is interrogated and converted into an acoustic signal. The acoustic signal can then be received by fiber optic line 504 and transmitted to the surface.

In some instances, tracers 520 of fiber optic line system 500 can transmit a unique ID that can be utilized to identify the type of fluid (e.g., mud 506, displacement fluid 508, spacer 512, and cement 514) in real-time. Information received from sensors and tracers 520 is valuable during the cementing process as this provides fiber optic line system 500 with real-time positions of the various fluids (e.g., mud 506, displacement fluid 508, spacer 512, and cement 514), and their respective levels of intermixing and any loss circulation (e.g., an indication of gas influx). In addition, tracking the real-time positions of sensors 520 can provide residence time distribution of sensors 520, and hence, the fluids (e.g., mud 506, displacement fluid 508, spacer 512, and cement 514) they are embedded in. The information and data received from fiber optic line 504, EATs 518, and/or sensors 520 may also be utilized to identify geometrical bottlenecks such as dead zones.

In other implementations, once cement 514 is positioned and it begins to set, tracer 520 locations may be utilized to track strain in cement 514 during hydration. In such cases, sensors 520 (e.g., RFID chips) can be embedded with other sensors 520 such as temperature, pressure, and pH sensors as described herein. Information and data received from fiber optic line 504, EATs 518, and/or sensors 520 may be utilized to update real-time hydraulic models to gain deeper insights into the operation of fiber optic line system 500. For example, real-time temperature may be used to optimize a retarder concentration for appropriate thickening time designs. Furthermore, fiber optic line system 500 can be utilized for both forward and reverse cementing applications. In particular, for reverse cementing processes, fiber optic line 504 can be installed inside casing 510 with EATs 518 embedded in a reverse float shoe (e.g., float shoe 416 of FIG. 4).

In some instances, EATs 518 of fiber optic line system 500 can be conduits of transmissions such that they receive data from sensors 520, and then EATs 518 can provide the data received from sensors 520 to the surface, which then sends the data to fiber optic line system 500. Furthermore, EATs 518 can convert the data received from sensors 520 into an acoustic pulse or an acoustic signal. The acoustic signal can then be detected by fiber optic line 504, which may be a distributed acoustic sensing fiber optic line. Fiber optic line 504 can then provide the data measured by sensors 520 to fiber optic line system 500. Thereafter, fiber optic line system 500 can populate fluid profiles for the various types of fluid (e.g., mud 506, displacement fluid 508, spacer 512, and cement 514) that can demonstrate fluid flow. Data measured by sensors 520 may be received by fiber optic line system 500 wirelessly or by wire via fiber optic line 504. Sensors 520 of fiber optic line system 500 may be battery operated, plugged into an active wire power line, or passively compatible (e.g., utilizing RFID) to communicate with fiber optic line system 500 via fiber optic line 504 or EATs 518.

In some implementations, EATs 518 can sense pressure and/or pH changes of the fluids (e.g., mud 506, displacement fluid 508, spacer 512, and cement 514) downhole in real-time. Using the pressure gradients (or pH), fiber optic line system 500 can identify the type of fluid (e.g., mud 506, displacement fluid 508, spacer 512, and cement 514), and hence, generate real-time positions of the various fluids (e.g., mud 506, displacement fluid 508, spacer 512, and cement 514) during the cementing operation. For example, the pressure gradient can be a function of the density and the viscosity of the corresponding fluid (e.g., mud 506, displacement fluid 508, spacer 512, and cement 514), which can then be utilized to identify the type of fluid (e.g., mud 506, displacement fluid 508, spacer 512, and cement 514). Moreover, each fluid has a distinct pH signature. For example, cement 514 has a higher pH (e.g., approximately 13) than other wellbore fluids (e.g., mud 506, displacement fluid 508, and spacer 512). Thus, by measuring pH, fiber optic line system 500 can identify that a fluid is indeed cement 514.

Figure 6:
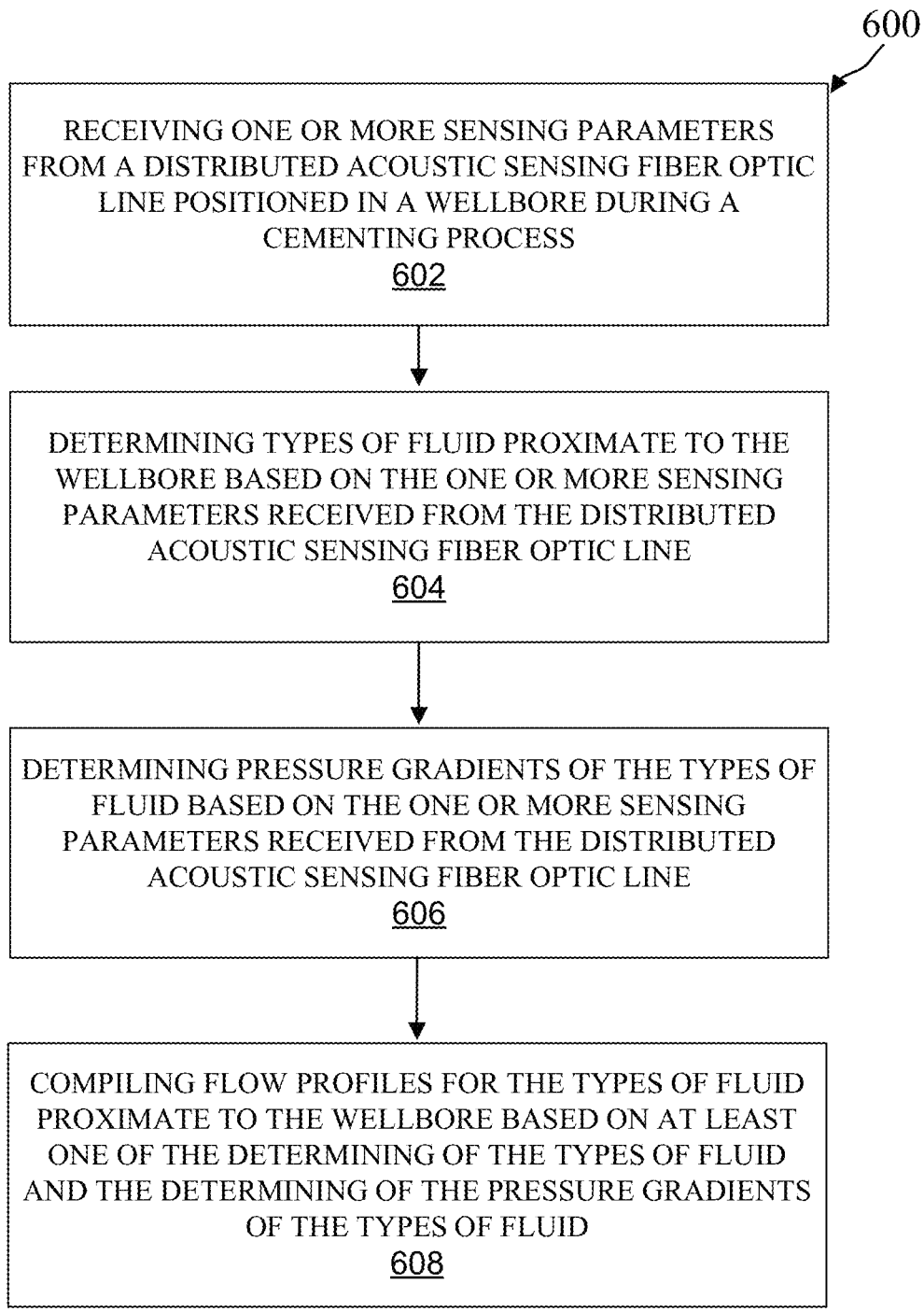
FIG. 6 shows an example process for determining positions of fluids during a cementing process in accordance with aspects of the present disclosure.

Having disclosed some example system components and concepts, the disclosure now turns to FIG. 6, which illustrate example method 600 for determining positions of fluids during a cementing process in real-time. The steps outlined herein are exemplary and can be implemented in any combination thereof, including combinations that exclude, add, or modify certain steps.

At stop 602, the method 600 can include receiving one or more sensing parameters from a distributed acoustic sensing fiber optic line positioned in a wellbore during a cementing process. In some instances, the one or more sensing parameters can include distributed sensing data from the distributed acoustic sensing fiber optic line, the distributed sensing data includes at least one of temperature data, acoustic data, vibration data, and strain data. In other instances, the distributed acoustic sensing fiber optic line can be communicatively coupled to a fiber optic sensing surface interrogator.

In some implementations, the receiving of the one or more sensing parameters can include receiving sensor data from at least one of an electro-acoustic transducer and a sensor via the distributed acoustic sensing fiber optic line. The sensor data from the at least one of the electro-acoustic transducer and the sensor can include at least one of pressure data, temperature data, pH data, resistivity data, conductivity data, and chemical data. The sensor can be a tracer that includes a radio frequency identification and is configured to measure temperature, pressure, and pH of the types of fluid proximate to the wellbore.

At stop 604, the method 600 can include determining types of fluid proximate to the wellbore based on the one or more sensing parameters received from the distributed acoustic sensing fiber optic line.

At stop 606, the method 600 can include determining pressure gradients of the types of fluid based on the one or more sensing parameters received from the distributed acoustic sensing fiber optic line. In some instances, the pressure gradients can vary over time as the types of fluid move along the wellbore.

At stop 608, the method 600 can include compiling flow profiles for the types of fluid proximate to the wellbore based on at least one of the determining of the types of fluid and the determining of the pressure gradients of the types of fluid.

In some implementations, a flow profile of method 600 can be compiled with either one of fluid types or pressure gradients as described herein. The method 600 can further determine the location of fluid type boundaries based on a volume of a given type of fluid that is pumped, a drilled wellbore volume, and a casing size. The error in the calculation corresponds to the fluid loss into the formation, variation of well-bore size, accuracy of sensors, thermal variations, etc. In some instances, measurement of fluid front movement and flow profiles can assist in determining fluid losses into the formation so that the cementing job can be adjusted accordingly. Method 600 contemplates utilizing either fluid type boundary locations and/or pressure gradients to determine fluid loss in the formation.

In other implementations, method 600 can further include adjusting the cementing process based on the flow profiles and a predetermined objective of cementing a specified portion of the wellbore, the adjusting of the cementing process being adjusted by at least one of a manual action, an automatic action, and a recommendation to an operator.

Figure 7:
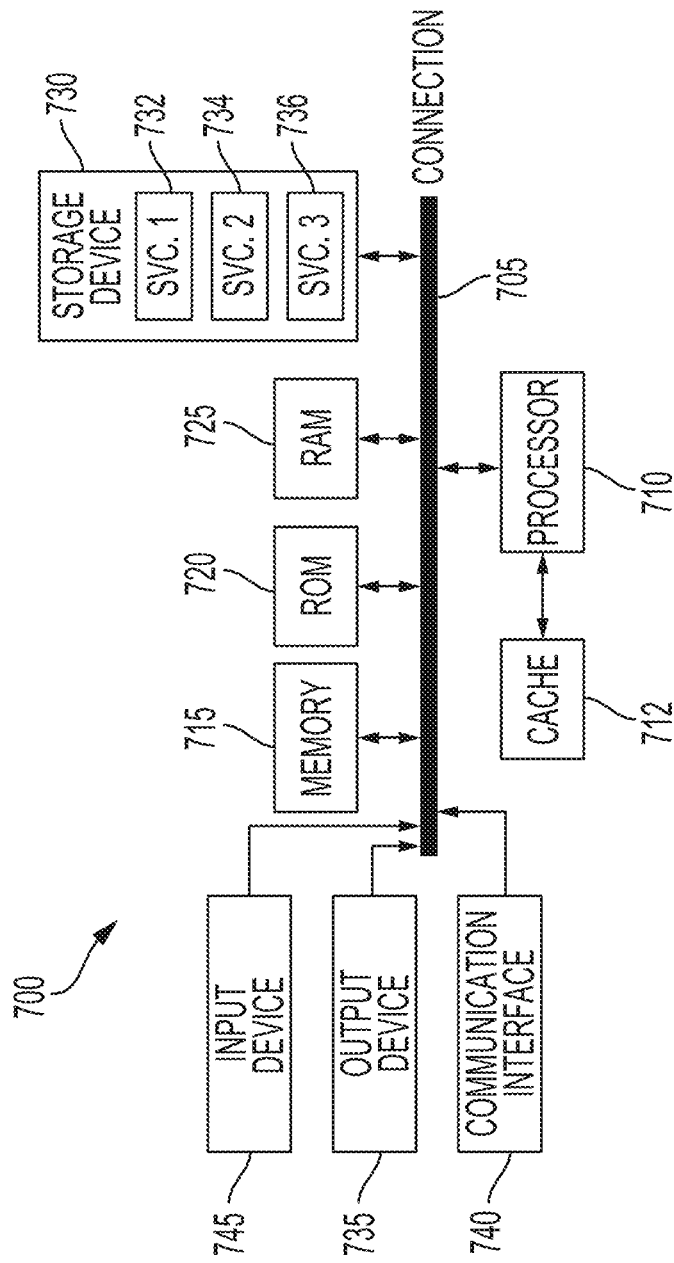
FIG. 7 shows an example computing device architecture which can be employed to perform various steps, methods, and techniques disclosed herein.

FIG. 7 illustrates an example computing device architecture 700 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 7 illustrates an example computing device architecture 700 of a computing device which can implement the various technologies and techniques described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or grail input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: A method comprising: receiving one or more sensing parameters from a distributed acoustic sensing fiber optic line positioned in a wellbore during a cementing process, determining types of fluid proximate to the wellbore based on the one or more sensing parameters received from the distributed acoustic sensing fiber optic line, determining pressure gradients of the types of fluid based on the one or more sensing parameters received from the distributed acoustic sensing fiber optic line, and compiling flow profiles for the types of fluid proximate to the wellbore based on at least one of the determining of the types of fluid and the determining of the pressure gradients of the types of fluid.

Statement 2: A method according to Statement 1, wherein the pressure gradients vary over time as the types of fluid move along the wellbore.

Statement 3: A method according to any of Statements 1 and 2, wherein the one or more sensing parameters include distributed sensing data from the distributed acoustic sensing fiber optic line, the distributed sensing data includes at least one of temperature data, acoustic data, vibration data, and strain data.

Statement 4: A method according to any of Statements 1 through 3, wherein the distributed acoustic sensing fiber optic line is communicatively coupled to a fiber optic sensing surface interrogator.

Statement 5: A method according to any of Statements 1 through 4, wherein the receiving of the one or more sensing parameters includes receiving sensor data from at least one of an electro-acoustic transducer and a sensor via the distributed acoustic sensing fiber optic line.

Statement 6: A method according to any of Statements 1 through 5, wherein the sensor data from the at least one of the electro-acoustic transducer and the sensor include at least one of pressure data, temperature data, pH data, resistivity data, conductivity data, and chemical data.

Statement 7: A method according to any of Statements 1 through 6, wherein the sensor is a tracer that includes a radio frequency identification and is configured to measure temperature, pressure, and pH of the types of fluid proximate to the wellbore.

Statement 8: A method according to any of Statements 1 through 7, further comprising adjusting the cementing process based on the flow profiles and a predetermined objective of cementing a specified portion of the wellbore, the adjusting of the cementing process being adjusted by at least one of a manual action, an automatic action, and a recommendation to an operator.

Statement 9: A system comprising: one or more processors; and at least one computer-readable storage medium having stored therein instructions which, when executed by the one or more processors, cause the system to: receive one or more sensing parameters from a distributed acoustic sensing fiber optic line positioned in a wellbore during a cementing process, determine types of fluid proximate to the wellbore based on the one or more sensing parameters received from the distributed acoustic sensing fiber optic line, determine pressure gradients of the types of fluid based on the one or more sensing parameters received from the distributed acoustic sensing fiber optic line, and compile flow profiles for the types of fluid proximate to the wellbore based at least one of on the determination of the types of fluid and the determination of the pressure gradients of the types of fluid.

Statement 10: A system according to Statement 9, wherein the pressure gradients vary over time as the types of fluid move along the wellbore.

Statement 11: A system according to any of Statements 9 and 10, wherein the one or more sensing parameters include distributed sensing data from the distributed acoustic sensing fiber optic line, the distributed sensing data includes at least one of temperature data, acoustic data, vibration data, and strain data.

Statement 12: A system according to any of Statements 9 through 11, wherein the distributed acoustic sensing fiber optic line is communicatively coupled to a fiber optic sensing surface interrogator.

Statement 13: A system according to any of Statements 9 through 12, wherein the receipt of the one or more sensing parameters includes receiving sensor data from at least one of an electro-acoustic transducer and a sensor via the distributed acoustic sensing fiber optic line.

Statement 14: A system according to any of Statements 9 through 13, wherein the sensor data from the at least one of the electro-acoustic transducer and the sensor include at least one of pressure data, temperature data, pH data, resistivity data, conductivity data, and chemical data.

Statement 15: A system according to any of Statements 9 through 14, wherein the sensor is a tracer that includes a radio frequency identification and is configured to measure temperature, pressure, and pH of the types of fluid proximate to the wellbore.

Statement 16: A non-transitory computer-readable storage medium comprising: instructions stored on the non-transitory computer-readable storage medium, the instructions, when executed by one or more processors, cause the one or more processors to: receive one or more sensing parameters from a distributed acoustic sensing fiber optic line positioned in a wellbore during a cementing process, determine types of fluid proximate to the wellbore based on the one or more sensing parameters received from the distributed acoustic sensing fiber optic line, determine pressure gradients of the types of fluid based on the one or more sensing parameters received from the distributed acoustic sensing fiber optic line, and compile flow profiles for the types of fluid proximate to the wellbore based on at least one of the determination of the types of fluid and the determination of the pressure gradients of the types of fluid.

Statement 17: A non-transitory computer-readable storage medium according to Statement 16, wherein the one or more sensing parameters include distributed sensing data from the distributed acoustic sensing fiber optic line, the distributed sensing data includes at least one of temperature data, acoustic data, vibration data, and strain data.

Statement 18: A non-transitory computer-readable storage medium according to any of Statements 16 and 17, wherein the distributed acoustic sensing fiber optic line is communicatively coupled to a fiber optic sensing surface interrogator.

Statement 19: A non-transitory computer-readable storage medium according to any of Statements 16 through 18, wherein the receipt of the one or more sensing parameters includes receiving sensor data from at least one of an electro-acoustic transducer and a sensor via the distributed acoustic sensing fiber optic line.

Statement 20: A non-transitory computer-readable storage medium according to any of Statements 16 through 19, wherein the sensor data from the at least one of the electro-acoustic transducer and the sensor include at least one of pressure data, temperature data, pH data, resistivity data, conductivity data, and chemical data.

What is claimed is:

1. A method comprising:
   receiving one or more optical signals from a distributed acoustic sensing enabled fiber optic line positioned and in a wellbore during a cementing process;
   determining an acoustic noise attenuation from the one or more optical signals from the distributed acoustic sensing enabled fiber optic line;
   determining a slope and a variation of acoustic noise attenuation;
   receiving pH data of fluid proximate to the wellbore from one or more sensors;
   determining types of fluid proximate to the wellbore based on the slope and the variation of the acoustic noise attenuation and the pH data;
   determining a fluid density of the types of fluid at a position within the wellbore;
   determining pressure gradients of the types of fluid based on the one or more optical signals received from the distributed acoustic sensing enabled fiber optic line;

compiling flow profiles for the types of fluid proximate to the wellbore based on the determining of the types of fluid and the determining of the pressure gradients of the types of fluid in real-time; and after compiling the flow profiles, adjusting the cementing process based on the flow profiles by a manual action or automatic action, wherein adjusting the cementing process includes adjusting a volume of a fluid delivered to the wellbore based on a loss of fluid determined by the flow profiles and stopping the cementing process when cement is properly positioned, wherein the pressure gradients are operable to determine one or more loss zones.

2. The method of claim 1, wherein the pressure gradients vary over time as the types of fluid move along the wellbore.

3. The method of claim 1, wherein the distributed acoustic sensing enabled fiber optic line is communicatively coupled to a fiber optic sensing surface interrogator.

4. The method of claim 1, further comprising receiving one or more sensing parameters which includes receiving sensor data from at least one of an electro-acoustic transducer and a sensor of the one or more sensors via the distributed acoustic sensing enabled fiber optic line.

5. The method of claim 4, wherein the sensor data from the at least one of the electro-acoustic transducer and the sensor include at least one of pressure data, temperature data, resistivity data, conductivity data, and chemical data.

6. The method of claim 4, wherein the sensor is a tracer that includes a radio frequency identification and is configured to measure temperature and pressure of the types of fluid proximate to the wellbore.

7. The method of claim 1, further comprising adjusting the cementing process based on a predetermined objective of cementing a specified portion of the wellbore, the adjusting of the cementing process being adjusted by at least one of a manual action, an automatic action, and a recommendation to an operator.

8. A system comprising:
one or more processors; and
at least one computer-readable storage medium having stored therein instructions which, when executed by the one or more processors, cause the system to:
receive one or more optical signals from a distributed acoustic sensing enabled fiber optic line positioned in a wellbore during a cementing process;
determine an acoustic noise attenuation received from the one or more optical signals from the distributed acoustic sensing enabled fiber optic line;
determine a slope and a variation of the acoustic noise attenuation;
receive pH data of fluid proximate to the wellbore from one or more sensors;
determine types of fluid proximate to the wellbore based on the slope and the variation of the acoustic noise attenuation and the pH data;
determine a fluid density of the types of fluid at a position within the wellbore;
determine pressure gradients of the types of fluid based on the one or more optical signals received from the distributed acoustic sensing enabled fiber optic line at a specific depth;
compile flow profiles for the types of fluid proximate to the wellbore based on the determination of the types of fluid and the determination of the pressure gradients of the types of fluid in real time; and after compiling the flow profiles, adjust the cementing process based on the flow profiles by a manual action or automatic action, wherein adjusting the cementing process includes adjusting a volume of a fluid delivered to the wellbore based on a loss of fluid determined by the flow profiles and stopping the cementing process when cement is properly positioned, wherein the pressure gradients are operable to determine one or more loss zones.

9. The system of claim 8, wherein the pressure gradients vary over time as the types of fluid move along the wellbore.

10. The system of claim 8, wherein the distributed acoustic sensing enabled fiber optic line is communicatively coupled to a fiber optic sensing surface interrogator.

11. The system of claim 8, further comprising the receiving one or more sensing parameters which includes receiving sensor data from at least one of an electro-acoustic transducer and a sensor of the one or more sensors via distributed acoustic sensing enabled fiber optic line.

12. The system of claim 11, wherein the sensor data from the at least one of the electro-acoustic transducer and the sensor include at least one of pressure data, temperature data, resistivity data, conductivity data, and chemical data.

13. The system of claim 11, wherein the sensor is a tracer that includes a radio frequency identification and is configured to measure temperature and pressure of the types of fluid proximate to the wellbore.

14. A non-transitory computer-readable storage medium comprising:
instructions stored on the non-transitory computer-readable storage medium, the instructions, when executed by one or more processors, cause the one or more processors to:
receive one or more optical signals from a distributed acoustic sensing enabled fiber optic line positioned in a wellbore during a cementing process;
determine an acoustic noise attenuation received from the one or more optical signals from the distributed acoustic sensing enabled fiber optic line;
determine a slope and a variation of the acoustic noise attenuation;
receive pH data of fluid proximate to the wellbore from one or more sensors;
determine types of fluid proximate to the wellbore based on the slope and variation of the acoustic noise attenuation and the pH data;
determine a fluid density at a specific depth of the types of fluid at the position;
determine pressure gradients of the types of fluid based on the one or more optical signals received from the distributed acoustic sensing enabled fiber optic line;
compile flow profiles for the types of fluid proximate to the wellbore based on the determination of the types of fluid and the determination of the pressure gradients of the types of fluid in real time; and after compiling the flow profiles, adjust the cementing process based on the flow profiles by a manual action or automatic action, wherein adjusting the cementing process includes adjusting a volume of a fluid delivered to the wellbore based on a loss of fluid determined by the flow profiles and stopping the cementing process when cement is properly positioned, wherein the pressure gradients are operable to determine one or more loss zones.

15. The non-transitory computer-readable storage medium of claim 14, wherein the distributed acoustic sensing enabled fiber optic line is communicatively coupled to a fiber optic sensing surface interrogator.

16. The non-transitory computer-readable storage medium of claim 14, further comprising receiving one or more sensing parameters which includes receiving sensor data from at least one of an electro-acoustic transducer and a sensor of the one or more sensors via the distributed acoustic sensing fiber optic line.

17. The non-transitory computer-readable storage medium of claim 16, wherein the sensor data from the at least one of the electro-acoustic transducer and the sensor include at least one of pressure data, temperature data, resistivity data, conductivity data, and chemical data.

* * * * *